US011584879B1

(12) United States Patent
Mosina et al.

(10) Patent No.: US 11,584,879 B1
(45) Date of Patent: Feb. 21, 2023

(54) INCREASING SCAVENGING EFFICIENCY OF H₂S SCAVENGER BY ADDING LINEAR POLYMER

(71) Applicant: Halliburton Energy Services, Inc., Houston, TX (US)

(72) Inventors: Yulia Mosina, Houston, TX (US); Zhiwei Yue, Sugar Land, TX (US); Ronald Oliver Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/558,392

(22) Filed: Dec. 21, 2021

(51) Int. Cl.
 *E21B 43/34* (2006.01)
 *C09K 8/54* (2006.01)

(52) U.S. Cl.
 CPC ............... *C09K 8/54* (2013.01); *E21B 43/34* (2013.01); *C09K 2208/20* (2013.01)

(58) Field of Classification Search
 CPC ........ C09K 8/54; E21B 43/34; C09L 2208/20
 See application file for complete search history.

(56) References Cited

U.S. PATENT DOCUMENTS

| | | | |
|---|---|---|---|
| 4,978,512 A | 12/1990 | Dillon | |
| 5,554,349 A | 9/1996 | Rivers et al. | |
| 6,582,624 B2 | 6/2003 | Titley et al. | |
| 9,347,010 B2* | 5/2016 | Rodriguez Gonzalez | ................... B01D 53/1468 |
| 11,292,952 B2* | 4/2022 | Cole | ........................ C09K 8/12 |
| 2002/0115798 A1* | 8/2002 | Narayan-Sarathy | ..... C08K 5/38 528/375 |
| 2008/0058229 A1* | 3/2008 | Berkland | ................. C09K 8/60 507/211 |
| 2014/0128294 A1* | 5/2014 | Gatlin | ...................... C09K 8/54 507/236 |
| 2017/0342309 A1 | 11/2017 | Yue et al. | |
| 2018/0265766 A1 | 9/2018 | Peng et al. | |
| 2018/0345212 A1 | 12/2018 | Legaspi Felipe et al. | |

(Continued)

FOREIGN PATENT DOCUMENTS

CA 2603022 2/2008

OTHER PUBLICATIONS

Taylor, Grahame N.; Prince, Philippe; Matherly, Ron; Ponnapati, Ramakrishna; Tompkins, Rose; Vaithilingam, Panchalingam (2012). Identification of the Molecular Species Responsible for the Initiation of Amorphous Dithiazine Formation in Laboratory Studies of 1,3,5-Tris (hydroxyethyl)-hexahydrotriazine as a Hydrogen Sulfide Scavenger. Industrial & Engineering Chemistry Research, 51(36), 11613-11617.

(Continued)

*Primary Examiner* — Silvana C Runyan
(74) *Attorney, Agent, or Firm* — Thomas Rooney; C. Tumey Law Group PLLC

(57) ABSTRACT

A method is disclosed that includes introducing a scavenger composition into a fluid stream contaminated with a sulfur contaminant such that the scavenger composition reacts with the sulfur contaminant to reduce an amount of the sulfur contaminant in the fluid stream, wherein the scavenger composition includes a hydrogen sulfide scavenger and an anionic linear polymer. A composition is disclosed that includes a hydrogen sulfide scavenger; and an anionic linear polymer.

19 Claims, 2 Drawing Sheets

(56) References Cited

U.S. PATENT DOCUMENTS

| | | | |
|---|---|---|---|
| 2020/0048533 A1* | 2/2020 | Xu | C09K 8/845 |
| 2020/0262724 A1 | 8/2020 | Prince et al. | |
| 2021/0095183 A1* | 4/2021 | Li | C09K 8/588 |

OTHER PUBLICATIONS

Yaser K. Al-Duailej, et al. Triazine-Based Scavengers: Can they be a Potential for Formation Damage, SPE157109, 2012.

* cited by examiner

INCREASING SCAVENGING EFFICIENCY OF H₂S SCAVENGER BY ADDING LINEAR POLYMER

BACKGROUND

The removal of hydrogen sulfide and other sulfur species from hydrocarbon fluids and aqueous streams in oil and gas production and refining is important because of the many safety and environmental hazards posed by the presence of such species. For example, during combustion, sulfur-rich hydrocarbon streams produce heavy environmental pollution. When sulfur-rich streams contact metals, sulfur species lead to brittleness in carbon steels and to stress corrosion cracking in more highly alloyed metals used in oil and gas production and refining operations. Moreover, hydrogen sulfide in various hydrocarbon or aqueous streams poses an environmental hazard if the hydrogen sulfide in these streams is released into the air or water sources.

Since $H_2S$ has an offensive odor and natural gas containing it is often called "sour" gas, treatments to reduce or remove $H_2S$ are often termed "sweetening." When a particular compound or agent is used to remove or reduce $H_2S$ levels, the agent is sometimes referred to as a scavenging agent. The sweetening or removal of $H_2S$ from petroleum or natural gas is only one example of where $H_2S$ level reduction or removal must be performed. In the manufactured gas industry or the coke-making industry, coal gas containing unacceptable amounts of $H_2S$ is commonly produced by the destructive distillation of bituminous coal having high sulfur content. Another $H_2S$ contamination problem is found in the manufacture of water gas or synthesis gas where it is not unusual to produce gas streams containing $H_2S$ by passing steam over a bed of incandescent coke or coal containing a minor amount of sulfur. $H_2S$ removal is also a frequently encountered problem in the petroleum industry because the principal raw material, crude oil, typically contains minor amounts of sulfur, principally in the form of organic sulfur compounds. During the course of the many processes to which the crude oil or fractions thereof are subjected, one or more gas streams containing $H_2S$ often result.

BRIEF DESCRIPTION OF THE DRAWINGS

These figures illustrate certain aspects of some of the embodiments of the present disclosure and should not be used to limit or define the disclosure.

DETAILED DESCRIPTION

Figure 1:
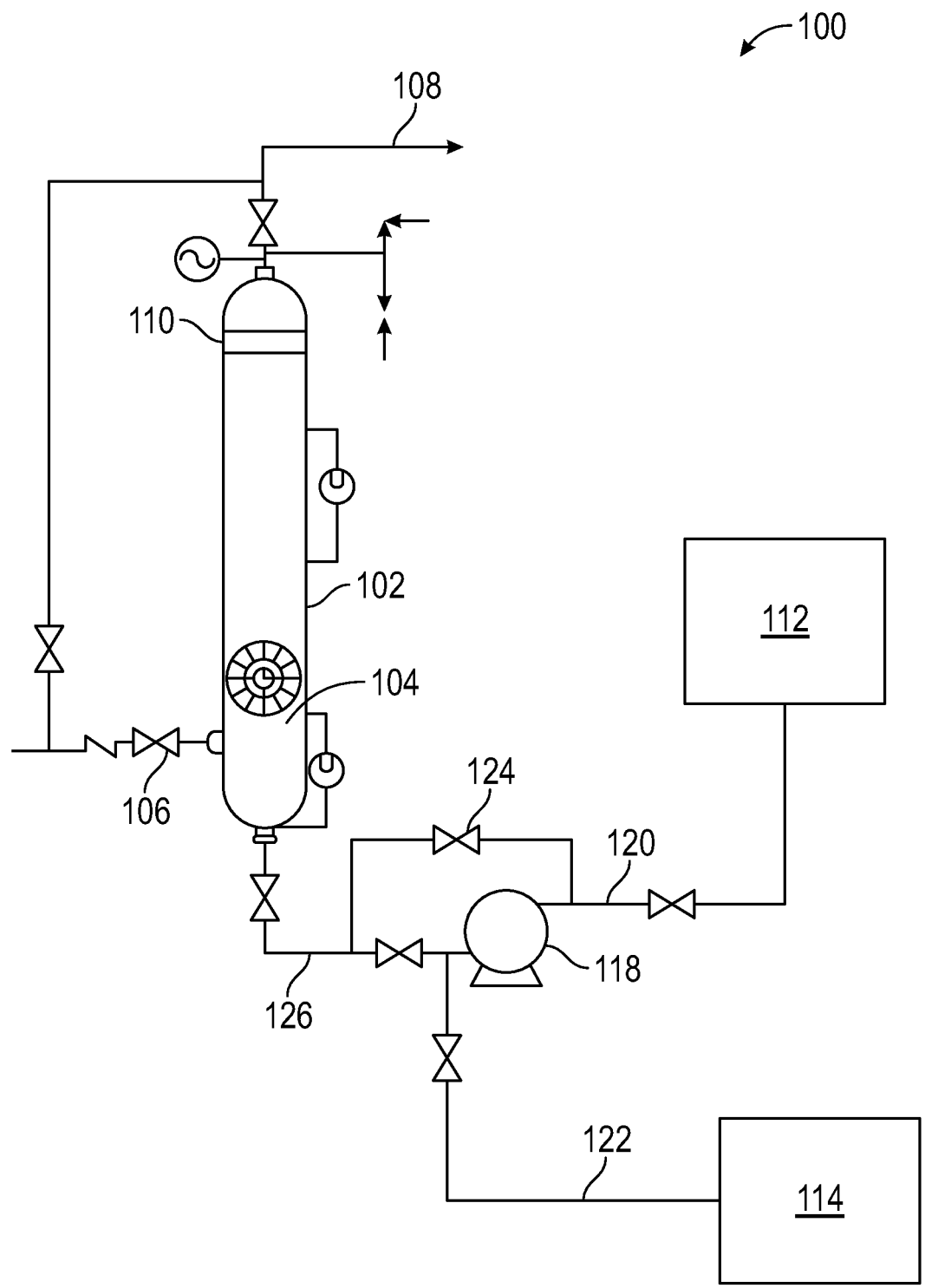
FIG. 1 depicts a bubble tower process appropriate for incorporating a triazine/formaldehyde blend with anionic linear polymer, in accordance with some embodiments of the present disclosure.

Disclosed herein are methods, systems and compositions relating to increasing hydrogen sulfide scavenging efficiency of hydrogen sulfide scavengers, such as triazine/aldehyde-based scavengers, hemiacetal scavengers, glyoxal scavengers, and others, by incorporating anionic linear polymers in the formulation. In addition to hydrogen sulfide, the hydrogen sulfide scavenges may also be effective and treating other sulfur contaminant, such as mercaptans.

The presence of hydrogen sulfide in hydrocarbon fluids and gas is a well-known problem in many oil and gas fields. Hydrogen sulfide is an undesirable contaminant which may present many environmental and safety hazards. For example, hydrogen sulfide may be corrosive, malodorous, and toxic. Many non-regenerative chemical formulations may exist in the market for removal of hydrogen sulfide. Typically, hydrogen sulfide scavengers may be preliminarily designed to react effectively at different in-situ conditions. One of the main groups of hydrogen sulfide scavengers may be based on aldehyde and amine reaction products, particularly triazines. Triazine-based hydrogen sulfide scavengers with additional free-formaldehyde in the formulation may show effective performance. Hydrogen sulfide scavengers based on a lower alkanolamine, and a lower aldehyde may selectively reduce the level of hydrogen sulfide and organic sulfides in a mostly instantaneous reaction in a gas stream. The methods, compositions, and systems disclosed herein may provide improved processes and compounds to reduce and/or remove the presence of $H_2S$ in liquid or gaseous streams. In some embodiments, the streams may include liquid or gaseous hydrocarbon streams. The methods compositions, and systems disclosed herein may also provide improved processes and compounds to reduce and/or remove the presence of $H_2S$ in gaseous streams.

Scavenger compositions may include a hydrogen sulfide scavenger and an anionic linear polymer. Examples of suitable hydrogen sulfide scavengers include triazines, dibutylamine/formaldehyde reaction product, and hemiacetal-based hydrogen sulfide scavengers. Examples of suitable triazines include monoethanolamine triazine and monomethylamine triazine. Combinations of suitable scavengers may also be used. Listed above hydrogen sulfide scavengers may be included in the scavenger compositions in any suitable amount, including an amount of about 5% to about 80% by weight of the total scavenger composition. Alternatively, the hydrogen sulfide scavenger may be present in an amount of about 5% to about 80%, about 10% to about 70%, about 20% to about 60%, or about 30% to about 50% based by weight of the total composition.

In some embodiments, the scavenging composition further include an aldehyde. Aldehydes are compounds containing a functional group —CHO. Examples of suitable aldehydes include formaldehyde and dialdehydes, such as glyoxal and glutaraldehyde. Combinations of aldehydes may also be used. The aldehydes may be present in the scavenger composition in any suitable amount, including an amount of about 0.5% to about 50% by weight of the scavenger composition. Alternatively, the aldehydes may be present in an amount of about 0.5% to about 50%, about 1% to about 40%, about 3% to about 30%, or about 5% to about 20% by weight of the scavenger composition.

In some embodiments, the aldehyde may be included in the scavenging composition with a triazine, in addition to the anionic linear polymer. Triazines are generally a class of nitrogen-containing heterocycles and include monoethanolamine triazine and monomethylamine triazine. The reaction products of a triazine and aldehyde may be extremely selective in their ability to react with and remove sulfides, e.g., hydrogen sulfides, carbon disulfides, carbonyl sulfides, and carbon sulfides, and combinations thereof, in the presence of any amount of carbon dioxide. The molar ratio of triazine and aldehyde may range from about 1:0.25 to about 1:10, or about 1:1 to about 1:1.5.

The present disclosure provides anionic linear polymers as a method of increasing the scavenging efficiency of the mixture with routinely used $H_2S$ scavengers such as triazine/ aldehyde-based scavengers, hemiacetal scavengers, glyoxal scavengers, and others. In accordance with certain embodiments, the anionic linear polymers may be low molecular weight. In certain embodiments, the anionic linear acrylate polymers have a number average molecular weight between $1.0 \times 10^3$ and $2.0 \times 10^4$ Daltons and increase the scavenging efficiency of the mixture by 10% or more, for example, by about 10% to about 30%, or about 10% to about 20%, or about 15% to about 18%.

The anionic linear polymers include any of a variety of suitable polymers and copolymers (and salts thereof) prepared from at least an acrylate monomer. Examples of suitable anionic linear polymers include ed to polyacrylic, polyacrylamides, salts of acrylamido-methyl propane sulfonate/acrylic acid copolymer (AMPS/AA), phosphonate maleic copolymer (PHOS/MA) or sodium salt of polymaleic acid/acrylic acid/acrylamido-methyl propane sulfonate terpolymers (PMA/AMPS), salts, or any combination thereof. In some embodiments the anionic linear polymer includes an anionic linear acrylate polymer. The anionic linear polymer may be included in the scavenger composition in any suitable amount, including an amount of about 0.1% to about 50% by weight of the scavenger concentration. Alternatively, anionic linear polymer may be present in an amount of about 0.1% to about 50%, about 0.15% to about 45%, about 0.2% to about 40%, about 0.3% to about 30%, about 0.4% to about 25%, about 0.5% to about 20%, or about 0.6% to about 10% by weight of the scavenger composition.

Compositions disclosed herein may also include a solvent. Examples of suitable solvents include water, methanol, ethanol, ethylene glycol, 2-butoxyethanol (EGMBE), butanol, IPA, and 2-ethylhexanol, and combinations thereof. Where used, the solvent may be present in the scavenger composition in any suitable amount, for example, an amount of about 1% to about 50% by weight of the scavenger composition. Alternatively, the solvent may be present in an amount of about 1% to about 50%, about 2% to about 45%, about 5% to about 40%, or about 10% to about 30% by weight of the scavenger composition.

The scavenger composition may be used to remove sulfides from a fluid stream by any suitable mean. Examples of fluid streams include aqueous streams and hydrocarbon streams. The hydrocarbon streams may include any of a variety of gaseous or liquid hydrocarbons streams contaminated with sulfide, such as natural gas, crude oil, fuel streams, asphalt, or refinery streams (e.g., refined oil, partially refined oil). The aqueous streams may include any of a variety of aqueous streams contaminated with sulfides, such as produced water, completion fluids, and streams flowing through aqueous systems such as cooling towers, cooling water systems, air-conditioning systems, wastewater treatment systems, deionized water systems, and combinations thereof. In accordance with present embodiments, the fluid streams may be contaminated with a sulfide, such as hydrogen sulfides, carbon disulfides, carbonyl sulfides, and carbon sulfides, and combinations thereof. In some embodiments, the scavenger composition may be introduced into a fluid stream that was previously recovered from a subterranean formation, such as produced gas.

In addition or in place of the sulfides, the scavenger composition may also be used for removal of other sulfur contaminants from a fluid stream, such as the previously described aqueous or hydrocarbon streams. An example of an additional sulfur contaminant includes mercaptans. Mercaptans are a group of sulfur-containing organic compounds in which the sulfur has replaced an oxygen of a hydroxyl group in the corresponding oxygenated compound. For example, mercaptans may include methyl mercaptan, in which the oxygen in methanol has been replaced; mercaptanol, in which one oxygen in ethanol has been replaced; and cyclohexyl mercaptan, in which the oxygen in cyclohexanol is replaced. The fluid stream may be contaminated with the sulfide (e.g., hydrogen sulfide) or other sulfur contaminant in an amount of 1 ppmw to 5% by weight of the fluid stream. After treatment, with the scavenger composition, the concentration of the sulfide or sulfur contaminant may be reduced in the fluid stream, for example, by up to 100%.

Any suitable technique may be used for contacting the scavenger composition with the contaminated fluid stream. For example, scavenger composition disclosed herein may be contacted with fluid stream by a plurality of means, including, but not limited to, inline injection, or with a contact scrubber, such as bubble and flooded tower applications. In each of these systems, towers may be used to increase the contact time between the reaction product and the fluid stream hydrocarbon stream, thereby improving efficiency over an in-line system. However, the methods and compositions disclosed herein may also be employed with in-line injection systems to reduce the hydrogen sulfide level in sour gas streams. The compositions disclosed herein may be injected at any point in-line, which may provide the scavenger composition the opportunity to react with the sulfur contaminants (e.g., sulfides), e.g., at the well-head, at the separators, etc. In an in-line injection system, the temperature and pressure of the fluid stream may not be critical for examples disclosed herein. The variation of temperatures and pressures within an in-line system may be evident to one skilled in the art based on the present disclosure and the particular system being used. Nonetheless, according to the present disclosure, for any system used, whether a tower system or an in-line system, the addition of anionic linear polymer may increase scavenging efficiency of scavenger composition, while precipitations (solid particulates) may be decreased.

In process, for example, we will now turn to FIG. 1, wherein FIG. 1 depicts a scavenger contact tower process, such as a bubble tower process 100, appropriate for incorporating a scavenger composition, in accordance with some embodiments of the present disclosure. Scavenger contact towers prove to be an effect treatment option for high volumes of gas and high concentrations of $H_2S$. As shown in FIG. 1, a bubble tower 102 may include a vessel containing the scavenger composition as described herein. Sparger 104 may be positioned at sour gas inlet 106. Sparger 104 may evenly distribute the gaseous fluid stream as it bubbles up through the scavenger composition and exits through gas outlet 108 at the top of the vessel. The fluid stream contaminated with the sulfur contaminant (e.g., sulfides) may enter bubble tower 102 through sour gas inlet 106, where it may react with scavenger composition. After entering bubble tower 102, the gas stream may directly interact with the scavenger composition and may be stripped of or otherwise of hydrogen sulfide and/or other sulfur contaminants, thereby reducing or eliminating sulfur contaminants in the gas stream. The treated gas stream may pass through demister 110 and exit the top of the bubble tower 102 and may be sent to the process or pipeline. Spent scavenger composition may be directed into spent chemical tank 112 and further disposed in accordance with regulations. A new batch of the scavenger composition from scavenger storage 114 may continuously feed bubble tower 102, resulting in a flooded bubble tower 102; or it may be added in batches, wherein bubble tower 102 may be referred to as a batch bubble tower. Spent scavenger composition from bubble tower 102 may flow through line 116 to pump 118, exiting pump 118 through line 120 into spent chemical tank. The new batch of scavenger composition from scavenger storage 114 may be pumped by pump 122 to bubble tower 102 by way of line 122 to pump 118 and then from pump 118 to bypass 124 and then line 126 to bubble tower 102.

Accordingly, the present disclosure may provide a method including introducing a scavenger composition into a fluid stream contaminated with hydrogen sulfide or other sulfur contaminant, wherein the scavenger composition includes a triazine, an aldehyde, and an anionic linear polymer. The present disclosure also provides methods including introducing a hydrogen sulfide scavenger composition into a fluid stream, wherein the scavenger composition includes a monoethanolamine triazine, formaldehyde, and an anionic linear polymer. The method may further include increasing the scavenging efficiency by at least about 10% over a scavenger composition that may be free of linear polymer, wherein the scavenger composition includes the triazine in an amount of about 5% to about 80% by weight of the scavenger composition, wherein the scavenging composition includes the aldehyde in an amount of about 0.5% to about 50% by weight of the scavenger composition, and wherein scavenger composition includes the anionic linear polymer in an amount of about 0.1% to about 50% by weight of the scavenger composition.

Accordingly, the present disclosure may provide scavenger compositions including a hydrogen sulfide scavenger and an anionic linear polymer. The methods, compositions, and systems may include any of the various features disclosed herein, including one or more of the following statements.

Statement 1. A method comprising: introducing a scavenger composition into a fluid stream contaminated with a sulfur contaminant such that the scavenger composition reacts with the sulfur contaminant to reduce an amount of the sulfur contaminant in the fluid stream, wherein the scavenger composition comprises a hydrogen sulfide scavenger and an anionic linear polymer.

Statement 2. The method of statement 1, wherein the scavenger composition further comprises a solvent.

Statement 3. The method of statement 1 or statement 2, wherein fluid stream is a liquid or gaseous hydrocarbon stream, and wherein the sulfur contaminant comprises hydrogen sulfide.

Statement 4. The method of any preceding statement, wherein the anionic linear polymer is present in the scavenger composition in an amount of about 0.1% to about 50% by weight of the scavenger composition.

Statement 5. The method of any preceding statement, wherein the anionic linear polymer has a number average molecular of about $1.0 \times 10^3$ to about $2.0 \times 10^4$.

Statement 6. The method of statement 5, wherein the anionic linear polymer is selected from the group consisting of a polyacrylic, a polyacrylamide, a salt of acrylamidomethyl propane sulfonate/acrylic acid copolymer, a phosphonate maleic copolymer, a sodium salt of polymaleic acid/acrylic acid/acrylamido-methyl propane sulfonate terpolymer, and combinations thereof.

Statement 7. The method of any preceding statement, wherein the anionic linear polymer comprises a non-branched polyacrylic acid.

Statement 8. The method of any preceding statement, wherein the hydrogen sulfide scavenger comprises a triazine, and wherein the scavenger composition further comprises an aldehyde, and wherein the sulfur contaminant comprises hydrogen sulfide.

Statement 9. The method of statement 8, wherein triazine comprises monoethanolamine triazine, and wherein the aldehyde comprises formaldehyde.

Statement 10. The method of statement 9, wherein the monoethanolamine triazine is present in an amount of about 5% to about 80% by weight of the scavenger composition.

Statement 11. The method of any one of statements 8 to 10, wherein the aldehyde comprise formaldehyde.

Statement 12. The method of any one of statements 8 to 10, wherein a scavenging efficiency of the scavenger composition is increased from about 10% to about 30% over the scavenger composition formulated without the anionic linear polymer.

Statement 13. The method of any one of statements 8 to 10, wherein the triazine is present in the scavenger composition in an amount of about 30% to about 60% by weight of the scavenger composition, wherein the aldehyde is present in the scavenger composition in an amount of about 5% to about 20% by weight of the scavenger composition, and wherein the anionic linear polymer is present in the scavenger composition in an amount of about 0.1% to about 50% by weight of the scavenger composition.

Statement 14. The method of any preceding statement, wherein introducing the scavenger composition into the fluid stream comprise contacting the scavenger composition and the fluid stream in a tower.

Statement 15. The method of statement 14, wherein the contacting comprises flowing the fluid stream through the scavenger composition, wherein the scavenger composition is contained in the tower.

Statement 16. The method of any one of statements 1 to 13, further comprising recovering the fluid stream from a subterranean formation prior to the introducing the scavenger composition into the fluid stream, and wherein the sulfur contaminant comprises hydrogen sulfide.

Statement 17. The method of statement 16, wherein the triazine comprises monoethanolamine triazine, wherein the monoethanolamine triazine is present in the scavenger composition in an amount of about 30% to about 60% by weight of the scavenger composition, wherein the scavenger composition further comprises formaldehyde, wherein the formaldehyde present in the scavenger composition in an amount of about 5% to about 20% by weight of the scavenger composition, and wherein the anionic linear polymer is present in the scavenger composition in an amount of about 0.1% to about 50% by weight of the scavenger composition.

Statement 18. A composition comprising: a hydrogen sulfide scavenger; and an anionic linear polymer.

Statement 19. The composition of statement 18, wherein the hydrogen sulfide scavenger comprises a triazine, and wherein the composition further comprises an aldehyde.

Statement 20. The composition of statement 19, wherein the anionic linear polymer comprises a non-branched polyacrylic acid.

To facilitate a better understanding of the present invention, the following examples of certain aspects of some embodiments are given. In no way should the following examples be read to limit, or define, the entire scope of the disclosure.

Example 1

A gas breakthrough test was used for determining degree or percentage spent for a particular scavenger composition, wherein a theoretical or nominal efficiency may be calculated based upon its chemical makeup. The static gas breakthrough tower testing system is well known in the art and is based on ASTM D6643-03 (2014). Gas contact tower input parameters include flow rate, scavenger volume, and scavenger concentration, wherein the inputs used to calculate the maximum possible mass of hydrogen sulfide that may be consumed. The actual mass of hydrogen sulfide consumed can also be calculated for a given breakthrough time, wherein the percentage for the theoretical maximum or degree spent can be calculated for each individual gas breakthrough test. The higher the percentage or degree spent, the more sulfur may be present in the fluid. Alternatively, lower percentages or degree spent equate to lower amounts of sulfur in the fluid, whereas higher percentages or degree spent may equate to higher amounts of sulfur in the fluid.

Scavenger compositions were formulated with monoethanolamine triazine and formaldehyde. A control sample did not include an anionic linear polymer or methanol. The control sample include monoethanolamine triazine in an amount of about 26%, formaldehyde in an amount of about 14%, and about 5% methanol. An additional sample was prepared that included a polyacrylic acid polymer (MW of 1000-2000) in an amount of 2% by weight. After sample preparation, a gas breakthrough test was performed on each scavenger composition with 99.5% hydrogen sulfide gas. Specifically, the scavenger compositions were each purged with 99.5% $H_2S$ at 100 Sml/min gas rate at specific timeframe for achieving 80% spent and 100% spent of the product. The time at which the fluid became cloudy was recorded. Then the samples of spent scavenger compositions were kept at different temperatures, wherein the temperatures were −20° C., 20° C. and 40° C.

The control sample without anionic linear polymer achieved 80% spent at 21.5 minutes of purge and 100% spent at 27 minutes of purge. The control sample became cloudy after 22.5 minutes of purge. The test sample with the anionic linear polymer achieved 80% spend at 21.5 minutes of purge and 100% spend at 27 minutes of purge. The test sample became cloudy after 25.5 minutes of purge. The 100%-spent test sample with the anionic linear polymer was observed to create less adherent or less pumpable solids by comparison to a 100% spent control sample without the anionic linear polymer. The 80%-spent product with the anionic linear polymer did not create solids, conversely, an additional lower layer was observed in in the control samples without the anionic linear polymer after storage at −20° C., 20° C. and 40° C.

Based on the above test results, it may be concluded that the addition of 2% by weight of the anionic linear polymer into scavenger composition increases scavenging efficiency by at least about 13% (as determined based on minutes of purge to cloudiness). It may be further concluded that the addition of 2% by weight of the anionic linear polymer into scavenger composition results in a reduction of solids.

Example 2

Additional hydrogen sulfide breakthrough tests were performed at various conditions and the $H_2S$ level was continuously measured and recorded by an $H_2S$ analyzer. The scavenger composition included a concentration of 3.33% by weight of the $H_2S$ scavenger in deionized water with a gas content of 300 ppm $H_2S/N_2$, and a gas flow rate of 200 Sml/min for 1 hour and 50 minutes, and then a flow rate of 300 Sml/min for 1 hour and 50 minutes. For this test, scavenger compositions were formulated with monoethanolamine triazine and formaldehyde. A control sample did not include an anionic linear polymer or methanol. The control sample include monoethanolamine triazine in an amount of about 26%, formaldehyde in an amount of about 14%, and 5% methanol. An additional sample was prepared that included an anionic linear polymer (polyacrylic acid polymer, MW 1000-2000) in an amount of 2% by weight.

Laboratory tests were performed to quantify the scavenging capacity of scavenger compositions with each composition mixed in deionized water in an amount of 3.33% by weight. As noted above, the tests were performed at 300 ppm $H_2S$ balanced with nitrogen at 20° C. for 1 hour and 50 minutes with 200 Sml/min flow rate. This was increased to 300 Sml/min for an additional 1 hour and 50 minutes.

The hydrogen sulfide breakthrough test requires the scavenger composition to remove all the hydrogen sulfide from a gas stream passing through a fixed column of the test sample. A detector may monitor the scavenging ability of the scavenger. The inlet gas stream may include a mix of gases, wherein the mix includes hydrogen sulfide balanced with nitrogen, purged through the fluid. As the mix of gases passes through the test sample, all hydrogen sulfide is removed, and effluent gas is then passed through the hydrogen sulfide analyzer, which detects and records the hydrogen sulfide level in ppm every minutes. During the experiment, the scavenger composition will eventually become exhausted, and the hydrogen sulfide will be detected in the effluent gas. The longer the breakthrough time, the better efficiency of the scavenger.

Figure 2:
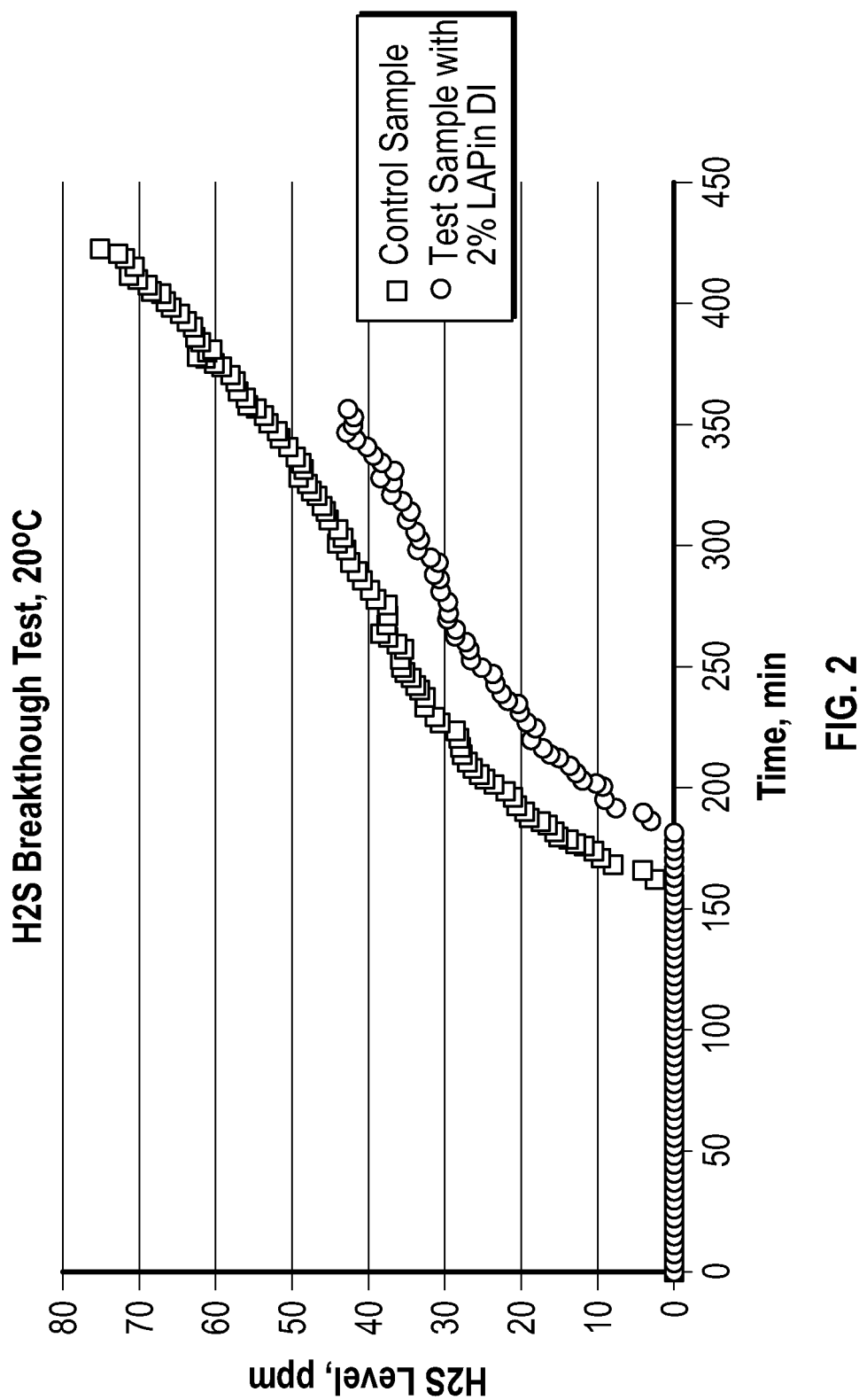
FIG. 2 is chart showing hydrogen sulfide levels versus time for an experimental test in accordance with one or more embodiments, in accordance with some embodiments of the present disclosure.

Each test included 14.5 ml of deionized water and 0.5 ml of $H_2S$ scavenger at room temperature (20° C.). The test gas was continuously bubbled through the test sample at a rate of 200 Sml/min for 1.5 hours. The rate was increased to 300 Sml/min for an additional 1.5 hours. FIG. 2 is a graph depicting the hydrogen sulfide breakthrough test results. According to the test results, 3.33% by weight of the control sample without the anionic linear polymer in deionized water was able to scavenge hydrogen sulfide until the hydrogen sulfide decreased to 0 ppm for 160.52 minutes. The breakthrough time of test sample with the anionic linear polymer was 15% longer at 184.52 minutes. Hence, the increase of breakthrough time of 15% for the test sample versus the control sample shows an increase of hydrogen sulfide scavenging efficiency due to adding the anionic linear polymer into the scavenger composition.

TABLE 1

$H_2S$ Breakthrough Test Results

| Tested Fluids in Deionized Water | Breakthrough Time (minutes) | Scavenged Amount of $H_2S$ until 4 ppm H2S detected (pounds) |
|---|---|---|
| Control Sample | 160.52 | 2.4E−05 (1.09E−0.5 kg) |
| Test Sample with Anionic Linear Polymer | 184.52 | 2.9E−05 (1.3 E−0.5 kg) |

The results of the hydrogen sulfide breakthrough tests are shown in Table 1. In scavenging performance experiments, until hydrogen sulfide is detected at 4 ppm, for the products involved, the control sample scavenged 2.4 E-0.5 lb (1.09 E-0.5 kg), whereas the test sample with anionic linear polymer scavenged 2.9 E-0.5 lb (1.3 E-0.5 kg), thereby indicating 18% more effectiveness than the control sample without the anionic linear polymer. Hence, based on the test results, adding 2% by weight of the anionic linear polymer into the formulation of scavenger composition may increase the H$_2$S scavenging efficiency by about 15% to about 18%.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method for contamination reduction comprising:
   introducing a scavenger composition into a fluid stream contaminated with a sulfur contaminant, wherein the scavenger composition reacts with the sulfur contaminant to reduce an amount of the sulfur contaminant in the fluid stream,
   wherein the scavenger composition comprises a mixture of a hydrogen sulfide scavenger, a solvent and an anionic linear polymer in an amount of about 0.1% to about 30% by weight of the scavenger composition,
      wherein the anionic linear polymer has a number average molecular weight of about $1.0 \times 10^3$ to about $2.0 \times 10^4$ Daltons; and
      wherein the solvent comprises water, alcohol, or any combination thereof.

2. The method of claim 1, wherein the solvent comprises water, methanol, ethanol, ethylene glycol, 2-butoxyethanol, butanol, isopropanol, 2-ethylhexanol, or any combinations thereof.

3. The method of claim 1, wherein fluid stream is a liquid or gaseous hydrocarbon stream, and wherein the sulfur contaminant comprises hydrogen sulfide.

4. The method of claim 1, wherein the anionic linear polymer is selected from the group consisting of a polyacrylic, a polyacrylamide, a salt of acrylamido-methyl propane sulfonate/acrylic acid copolymer, a phosphonate maleic copolymer, a sodium salt of polymaleic acid/acrylic acid/acrylamido-methyl propane sulfonate terpolymer, and combinations thereof.

5. The method of claim 1, wherein the anionic linear polymer comprises a non-branched polyacrylic acid.

6. The method of claim 1, wherein introducing the scavenger composition into the fluid stream comprise contacting the scavenger composition and the fluid stream in a tower.

7. The method of claim 6, wherein the contacting comprises flowing the fluid stream through the scavenger composition, wherein the scavenger composition is contained in the tower.

8. The method of claim 1, wherein the hydrogen sulfide scavenger comprises a triazine, and wherein the scavenger composition further comprises an aldehyde, and wherein the sulfur contaminant comprises hydrogen sulfide.

9. The method of claim 8, wherein triazine comprises monoethanolamine triazine, and wherein the aldehyde comprises formaldehyde.

10. The method of claim 9, wherein the monoethanolamine triazine is present in an amount of about 5% to about 80% by weight of the scavenger composition.

11. The method of claim 8, wherein the aldehyde comprise formaldehyde.

12. The method of claim 8, wherein a scavenging efficiency of the scavenger composition is increased from about 10% to about 30% over the scavenger composition formulated without the anionic linear polymer.

13. The method of claim 8, wherein the triazine is present in the scavenger composition in an amount of about 30% to about 60% by weight of the scavenger composition, wherein the aldehyde is present in the scavenger composition in an amount of about 5% to about 20% by weight of the scavenger composition.

14. The method of claim 1, further comprising recovering the fluid stream from a subterranean formation prior to the introducing the scavenger composition into the fluid stream, and wherein the sulfur contaminant comprises hydrogen sulfide.

15. The method of claim 14, wherein the triazine comprises monoethanolamine triazine, wherein the monoethanolamine triazine is present in the scavenger composition in an amount of about 30% to about 60% by weight of the scavenger composition, wherein the scavenger composition further comprises formaldehyde, wherein the formaldehyde present in the scavenger composition in an amount of about 5% to about 20% by weight of the scavenger composition.

16. The method of claim 1, wherein the anionic linear polymer is present in an amount of about 0.6% to about 10% by weight of the scavenger composition.

17. The method of claim 1, wherein the hydrogen sulfide scavenger is present in an amount of about 20% to about 60% by weight of the scavenger composition.

18. A composition for contamination reduction consisting of a mixture of:
   a hydrogen sulfide scavenger, wherein the hydrogen sulfide scavenger comprises a triazine, and wherein the composition further comprises an aldehyde;
   a solvent, wherein the solvent comprises water, an alcohol, or any combinations thereof; and
   an anionic linear polymer in an amount of about 0.10% to about 30% by weight of the scavenger composition, wherein the anionic linear polymer has a number average molecular weight of about $1.0 \times 10^3$ to about $2.0 \times 10^4$ Daltons.

19. The composition of claim 18, wherein the anionic linear polymer comprises a non-branched polyacrylic acid.

\* \* \* \* \*